Aug. 25, 1970  S. J. HARRISON ET AL  3,525,265
APPARATUS FOR MOUNTING A SHAFT CARRYING AN UNBALANCED WEIGHT
Filed Dec. 20, 1966  4 Sheets-Sheet 3
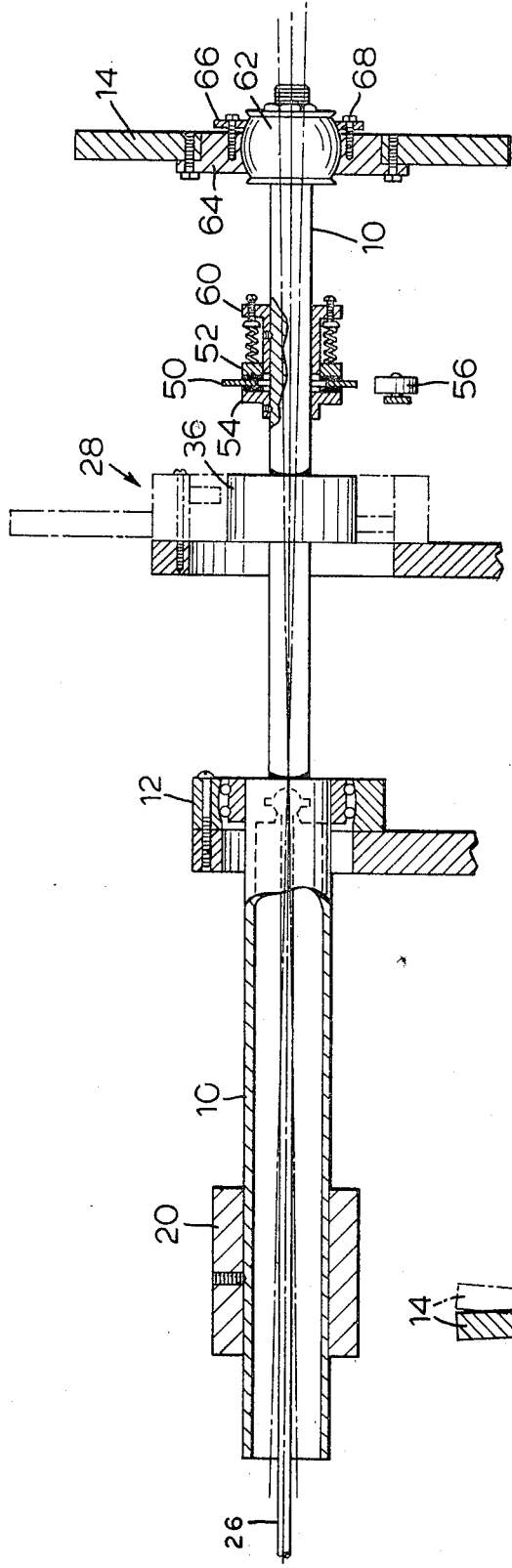
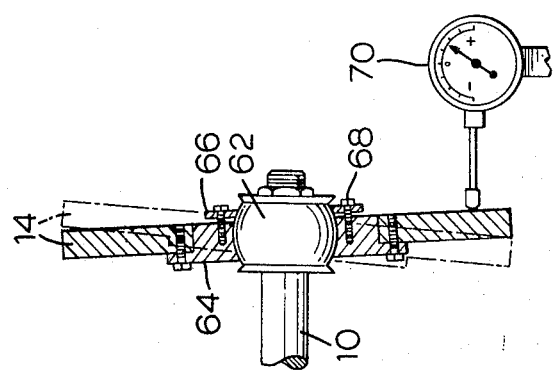
*INVENTORS*
SIDNEY J. HARRISON
FRANCIS MACKAY
BY *Fetherstonhaugh & Co.*
ATTORNEYS

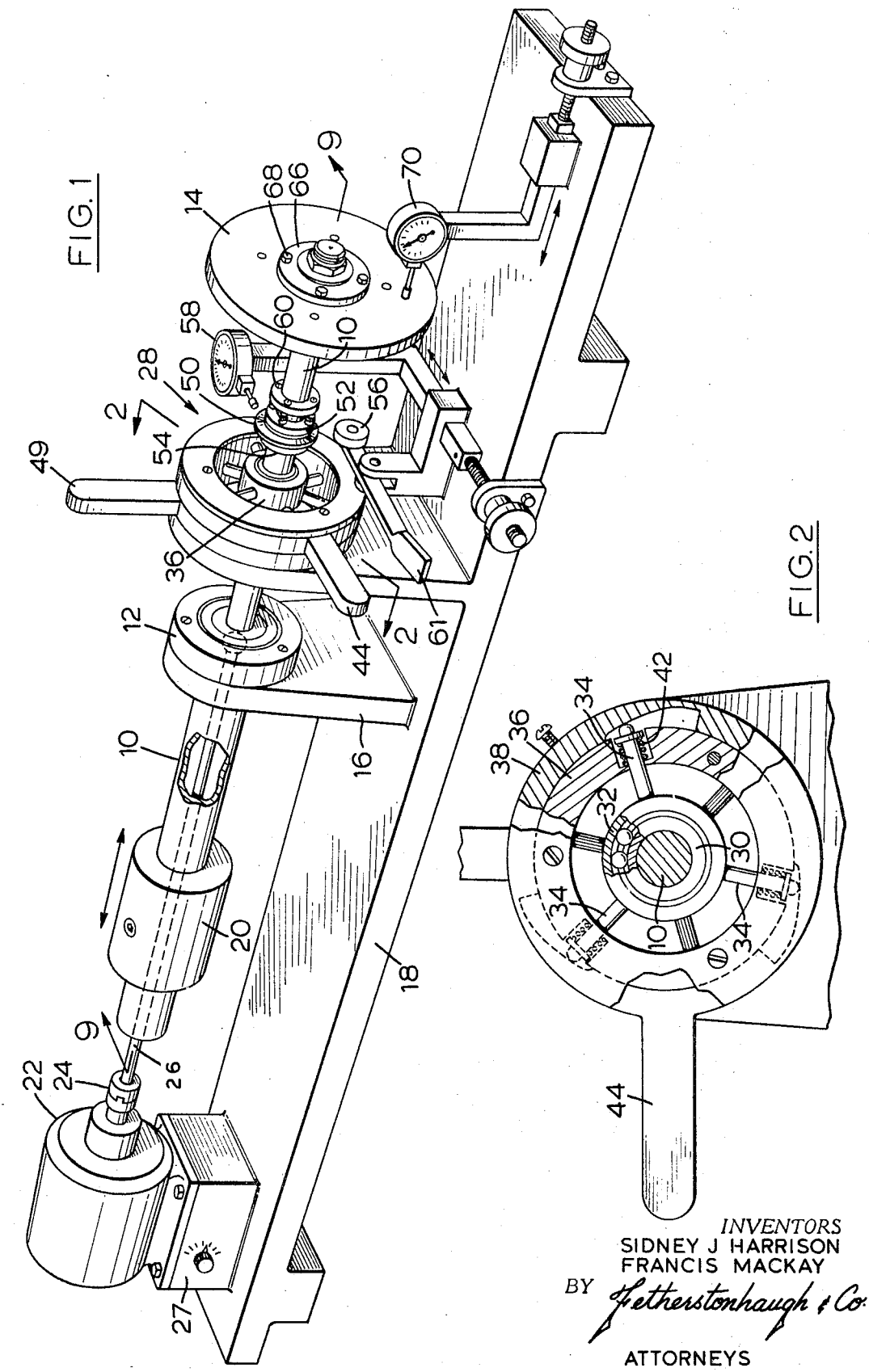

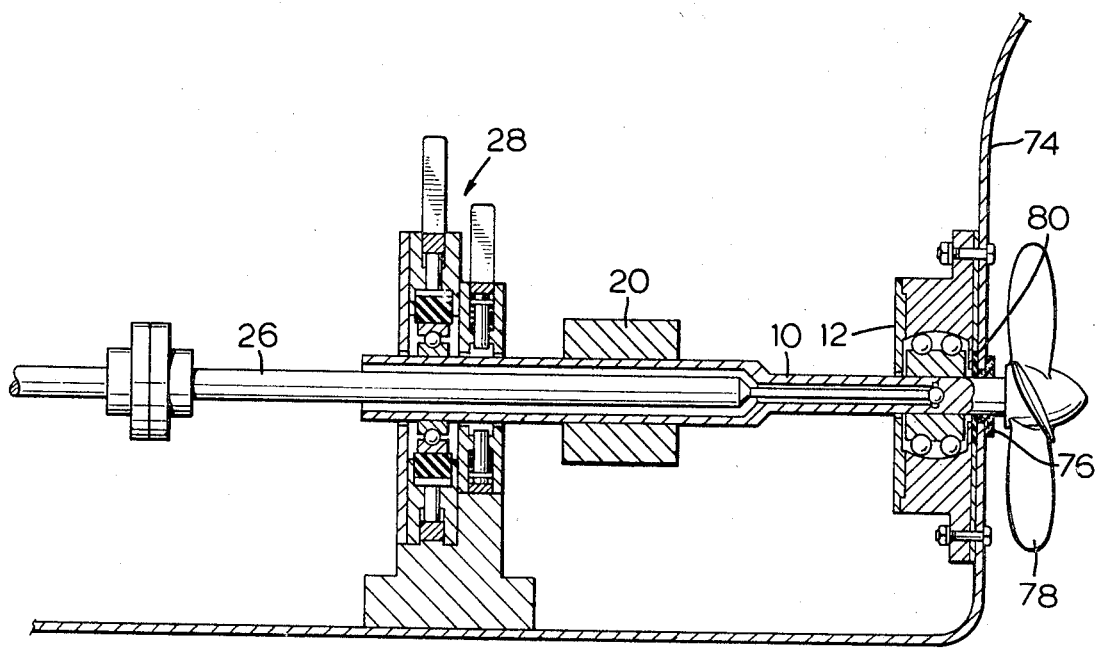

United States Patent Office 3,525,265
Patented Aug. 25, 1970

---

3,525,265
APPARATUS FOR MOUNTING A SHAFT CARRYING AN UNBALANCED WEIGHT
Sidney J. Harrison, 258 Briarhill Road, and Francis MacKay, 33 Light St., both of Woodstock, Ontario, Canada
Filed Dec. 20, 1966, Ser. No. 603,318
Int. Cl. G01m 1/16
U.S. Cl. 73—473  2 Claims

ABSTRACT OF THE DISCLOSURE

A balancing machine including a shaft mounted for rotation in a self-aligning bearing, the shaft extending from both sides of the bearing and having means on one side of the bearing for mounting an unbalanced weight and means on the other side thereof supporting an adjustable counterweight whereby static equilibrium may be achieved about the self-aligning bearing by adjustment of said counterweight before the unbalanced weight is rotated such that, when the unbalanced weight is rotated, the centre of the shaft will orbit in a substantially circular path. The shaft is rotatably driven by means connected thereto at the self-aligning bearing such that the balance of the shaft about the bearing is not affected by the drive means. The displacement of the shaft during rotation is measured by a washer-like registration disc mounted coaxially on the shaft. Means is also provided for displacing the registration disc relative to the shaft until the registration disc rotates without orbital action. A further feature is the provision of means for restraining the lateral displacement of the shaft while continuing to rotate in a circular orbit. The restraining means includes an annular element surrounding the shaft and resilient rubber pads extending from the annular element to the shaft.

---

This invention relates to rotatable shaft mounting arrangements and is particularly concerned with an apparatus for mounting a shaft carrying an unbalanced weight whereby to avoid all detrimental effects due to the unbalance or whereby it is possible to measure and locate the extra mass causing the unbalance so that the unbalanced condition may be corrected.

The rotatable shaft mounting apparatus of the invention can be used in balancing machines whereby engine crankshafts and other devices which rotate can be accurately balanced. Alternatively, the apparatus of the invention may be used to mount shafts carrying ships' propellers and the like so that even if a propeller is statistically or dynamically unbalanced or both, the vibration causing effect of the unbalance is eliminated. In the interests of brevity, the invention is described in the following specification as utilized in only two sample applications, viz (i) a balancing machine and (ii) a shaft mounting arrangement for a ship's propeller, but it should be understood that the invention is equally adaptable to mounting any shaft carrying an unbalanced weight. One of the chief advantages of the invention as used in mounting such things as propellers is that propellers are also subject to unbalance due to different thrust values from the different blades even though the propeller might be in perfect dynamic and static balance and the shaft mounting arrangement of the invention automatically eliminates the detrimental effects of these unequal thrust forces which do not normally show up until the propeller is in actual use. Further, it is not unknown to have any one of the dynamic, static or thrust force balances upset with the propeller in operation and the shaft mounting arrangement of the invention will automatically accommodate a change in any one of these.

The known balancing machine and shaft mounting arrangements are all characterized by the use of two or more bearings supporting the shaft. The effect of the bearings is, therefore, to restrain any tendency of the shaft to move laterally of its central longitudinal axis under the influence of an unbalanced weight carried by the shaft. Indeed, it is the common practice in mounting a shaft for a ship's propeller to employ very heavy bearings so that they will not break down or shift should the propeller become unbalanced in use. While the use of such heavy bearings does have the effect of holding the shaft in place, the vibration transmitted to the ship can be discomforting if not dangerous.

The use of two or more bearings in a balancing machine for carrying the shaft on which the weight to be balanced is mounted has the same disadvantages as above mentioned and normally means that the weight to be balanced cannot be rotated at the full speed that it will eventually be rotated in use until at least preliminary balancing has been effected. Thus, the balancing procedure often involves a number of rotation stages before the weight can be rotated at its designed speed or requires use of extremely heavy bearings and frame to withstand the vibration.

It is, therefore, an object of this invention to provide and apparatus for mounting a shaft carrying an unbalanced weight which can be incorporated in a balancing machine for carrying out balancing operations quickly and with a high degree of accuracy.

It is a further object of the invention to provide an apparatus for mounting a shaft carrying a rotating weight which can be incorporated in a balancing machine of the above type and which is adapted to measure both the degree and position of the static unbalance of the weight and the degree and position of the dynamic unbalance of the weight.

It is a further object of the invention to provide an apparatus for mounting a shaft carrying an unbalanced weight which may be utilized in mounting a shaft carrying a ship's propeller or the like whereby the shaft and propeller can be safely rotated at design speed even if the propeller should be statically or dynamically unbalanced or out of balance due to different thrust forces from the different propeller blades.

The objects of the invention are achieved by a method and apparatus for mounting a shaft carrying an unbalanced weight wherein the method essentially consists of supporting the shaft in a single self-aligning bearing and by mounting a counterweight on the shaft on the opposite side of the bearing from the weight being rotated and wherein the apparatus consists of such a bearing and counterweight. In rotating the shaft, it is desirable that the driving force be transmitted to the shaft at the center of the bearing. The use of the single self-aligning bearing permits the ends of the shaft to "orbit" about the true center line of the apparatus should the weight carried by the shaft be unbalanced. As used in a balancing machine, this principle of mounting a shaft can be used to measure both the degree and position of the misplaced mass which causes the static unbalance through providing means for measuring the degree of orbit achieved by the rotating shaft. The advantages of this principle of mounting such things as ships' propellers stem from the use of the single self-aligning bearing as no attempt is made to restrain the "orbiting" of the shaft as has been done in known shaft mounting arrangements.

The above and further objects of the invention will be more thoroughly understood from the following description thereof as read in conjunction with the accompanying drawings.

In the drawings,

FIG. 1 is a perspective view, partly broken away, of a balancing machine incorporating the shaft mounting apparatus and method of the invention;

FIG. 2 is a cross-sectional view taken along the line 2—2 of FIG. 1 which has been partly broken away for better illustration of certain details of the apparatus;

Figure 4:
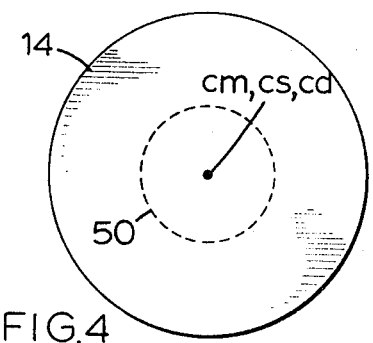

FIGS. 4 to 8 inclusive are schematic representations of a weight mounted on the apparatus of FIG. 1 and illustrating the manner in which the static unbalance of the weight can be measured;

FIG. 9 is a cross-sectional view of the apparatus shown in FIG. 1 as taken along the line 9—9 of FIG. 1 and showing certain parts of the apparatus broken away for illustrating these parts in greater detail;

FIG. 10 is an enlarged cross-sectional view through the end of the apparatus of FIG. 1 at which the unbalanced weight is carried and showing the manner in which the dynamic unbalance of the part is measured; and FIG. 11 is a vertical cross-sectional view through an apparatus for mounting a ship's propeller which includes the method and apparatus of the invention.

As a means of explaining the theory of the method and apparatus of the invention, the application of this theory is illustrated as used in a balancing machine which is shown in FIGS. 1 to 10 inclusive.

The balancing machine illustrated essentially consists of a shaft 10 mounted for rotation about its longitudinal axis in a self-aligning bearing 12 and carrying a weight 14 at its free end which is to be statically and dynamically balanced. The weight shown is simply a disc but it should be understood that the weight might consist of any element is to be rotated in use. For example, the weight might be an engine crankshaft, a flywheel, a propeller or a rotor for a jet engine. The bearing 12 is of the self-aligning type which is known per se and permits the shaft to assume an angle relative to the central axis of the bearing as well as to rotate. Thus, it can be seen that should the weight which is carried at the end of the shaft be dynamically or statically unbalanced, the opposed ends of the shaft will actually orbit about the central axis of the machine which is defined by the axis of the bearing or by the longitudinal axis of the shaft when the latter is stationary. As bearing 12 is of the self-aligning type, a counterweight 20 is mounted on the shaft on the opposite side of the bearing from the weight as to prevent that end of a shaft which carries the weight from dropping down. In the illustrated apparatus, the position of the counterweight 20 on the shaft can be adjusted so that it might be moved to counterbalance different weights. Further, of course, it will be understood that should the maximum adjustment possible with any one counterweight not be sufficient to counterbalance any particular weight mounted on the opposite end of the shaft, that particular counterweight can be removed and replaced by another which will provide sufficient counterbalance. As will be explained hereinafter, the counterweight used in a shaft mounting arrangement for a ship's propeller could be permanently fixed to the shaft at the proper counterweighing position.

Rotation of the shaft is effected by a variable speed electric motor 22 controlled through a rheostat 27 and connected through a flexible coupling 24 to a drive shaft 26. The drive shaft extends through shaft 10 and is connected to the inside of the shaft 10 at bearing 12. It is the object of this particular driving connection to achieve rotation of the shaft about its longitudinal axis which will permit both ends of the shaft to "orbit" about the center line of the machine. As the degree of orbiting immediately adjacent the bearing would be normally quite small, it would be possible to use a belt drive adjacent the bearing in lieu of the particular driving connection illustrated. In this connection it should be understood that the degree of orbiting would be quite small in balancing most things such as engine crankshafts, propellers, etc. as the degree of unbalance of these pieces of equipment is not normally so high that either end of shaft 10 might be laterally displaced from the true center of the apparatus by a matter of inches. In other words, the spacing between the drive shafts 26 and the inside of the shaft 10 need not exceed a half inch for most practical applications. Should any propeller or crankshaft being balanced throw the shaft 10 into an orbit which would exceed this half inch clearance, this fact would become immediately apparent upon commencing rotation of the shaft and the apparatus can be shut down and the article being balanced removed for a preliminary rough balance. On the other hand, if there is an unbalanced condition which would cause the two ends of the shaft 10 to orbit to such a degree that lateral displacement of the ends of the shaft is in the order of a few thousandths of an inch, any attempt to restrain this tendency to orbit by rigidly mounting the shaft with two spaced bearings would set up considerable vibration in the apparatus.

Positioned between bearing 12 and weight 14 is a second bearing assembly generally indicated by reference numeral 28. This assembly is capable of being locked as to restrain the shaft against any tendency to orbit, but which can then be freed to allow orbiting. The ability to lock this bearing permits the shaft to be held rigidly between the bearings 12 and 28 during initial start-up and slowing down of the machine, at which time the speed of rotation of the shaft is not sufficient to throw the off-balance causing misplaced mass into a smooth orbital condition. As will be apparent from the following specification, bearing assembly 28 also acts when unlocked as a shock-absorbing bearing which, while permitting orbiting of the shaft, restrains the orbiting effect by spring pressure.

Figure 3:
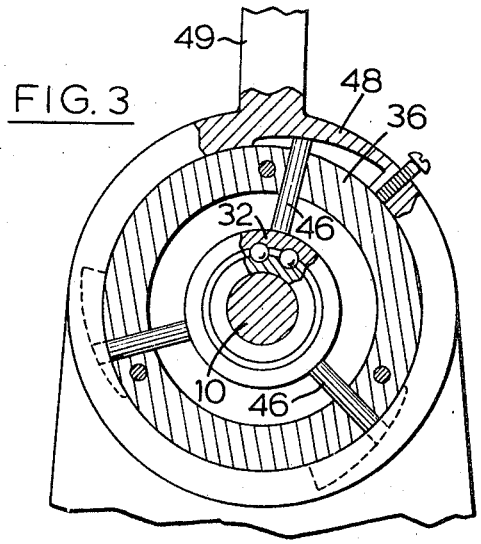
FIG. 3 is a cross-sectional view similar to FIG. 2 but showing certain of the parts illustrated in FIG. 2 in still greater detail.

The details of construction of the bearing 28 are shown in FIGS. 2 and 3. Referring to FIG. 2, it can be seen that the shaft 10 has permanently fixed to its outer surface an inner race 30 of a ball bearing assembly having an outer race 32 and the usual balls between the two races. Three locking pins 34 bear against the outer race 32 and are supported in a ring element 36 having a circular camming member 38 surrounding it. The outer ends of pins 34 carry a shoulder 40 and a spiral spring 42 is engaged on the pin between the shoulder 40 and the bottom of a recess in the ring element 36. At the extreme outer end of the pin, there is carried a ball which cooperates with cutouts in the camming member 38 whereby the pins may be moved in and out of contact with the outer race 32 rotating camming member 38 with handle 44.

From the foregoing it will be apparent that bearing assembly 28 is adapted to releasably lock on to shaft 10 whereby to restrain any lateral movement thereof. This ability to lock the shaft 10 in the axial center position is important in the operation to be described later whereby measurements are taken to determine the degree and position of the unbalancing condition of the weight 14. In use, the bearing assembly 28 is normally solidly locked when the machine is started up and after the rotation has commenced, it is freed to allow the shaft to "orbit" under the influence of the unbalanced weight. Again, the bearing assembly 28 is locked just before the rotation of the shaft and the weight comes to an end.

As previously mentioned, the bearing assembly also is capable of restraining shaft 10 with resilient members so that when the bearing assembly is unlocked, the resilient members, while permitting the shaft to orbit, do hold the orbiting action within the tolerable level. This function of the bearing assembly is illustrated in FIG. 3. Here the resilient members are depicted in the form of pins 46 formed of resilient material such as rubber but in actual fact the pins take the form of blocks. The outer ends of the pins 46 are received in cutouts in a second camming member 48 having a handle 49 whereby the camming member may be rotated. Thus, it can be seen that by rotating the camming member it is possible to adjust the resiliency of the pins whereby the resilient restraining action on the shaft can be adjusted. This particular function of the bearing assembly, i.e. to hold the shaft by resilient blocks, is largely a safety measure so that should an extremely unbalanced weight tend to throw the shaft 10 into a degree of orbit which would exceed the resiliency of the blocks, the bearing assembly, although unlocked, then acts as a second bearing, i.e. the machine is similar to previous balancing machines which hold the rotating shaft within two spaced bearings. Naturally in this condition the machine vibrates to the same degree as would a machine built on known principles. In the normal course, such extreme tendency to orbit is never encountered.

The equipment which is used to take the actual measurements of the amount and position of the unbalanced condition consists of a registration disc 50 held between two pads 52 and 54 of friction material, a roller 56 for bringing pressure against the outside edge of disc 50 and a gauge 58 for measuring displacement of the disc. An adjustable collar 60 is fixed to the shaft and carries a plurality of springs for changing the pressure between the friction material carrying pads 52 and 54. This pressure should be just sufficient to ensure that disc 50 will "orbit" with the shaft but still permitting the disc to be moved relative to the longitudinal axis of the shaft by the roller 56. In the interest of accuracy, it should be noted that while registration disc 50 is called a disc it actually consists of a large washer-like element, i.e. a disc having a central round aperture. This aperture has a diameter which exceeds the diameter of the shaft whereby the disc may be displaced relative to the shaft.

The procedure in measuring the degree of static unbalance of the weight 14 on the machine shown in the drawings is as follows. As a first step it is essential, of course, to attach the weight 14 to the free end of shaft 10. Then it is required to adjust the counterweight 20 so as to counterbalance the weight 14. In this regard, it should be understood, however, that in using a balancing machine of the type illustrated, one is normally balancing a plurality of similar articles of approximately the same weight so that once the counterweight 20 has been adjusted for the first of such a plurality of articles, it is not then necessary to readjust the weight again until a different type of article is being counterbalanced.

The other two adjustable features of the apparatus, namely the variable resiliency of the pins or blocks 40 and the variable pressure between the registration disc holding pads 52 and 54 are also normally preadjusted for any particular similar series of articles to be balanced as is done with the adjustment to the counterweight 20.

With all the adjustments present, current is fed to motor 22 and when rotation of the shaft has commenced, the bearing assembly 28 is unlocked by moving handle 44 in the counterclockwise direction as seen in FIG. 2 whereby to permit the shaft to "orbit" due to any unbalance that might exist in the weight 14. In this regard, it will be understood that if bearing 28 were left in the locked position, there would be a shaft restraining condition not unlike the condition imposed by prior balancing machines which use two or more bearings to carry the shaft. Thus, bearing 28 is released from the locked position before the vibration set up in the machine becomes dangerous. Following release of bearing 28, the speed of rotation of the shaft is increased until the shaft reaches a speed equivalent to the rotational rate at which the weight being balanced will be rotated in use. At this point and assuming that weight 14 is actually statically unbalanced, i.e. that it is somewhat heavier on one side of its central axis, the weight and the shaft will be thrown into an orbiting condition which means, of course, that the ends of the shaft "orbit" around the center line of the machine defined by a line extending through the center of bearing 12 and the center of bearing assembly 28 or, in other words, by the center line of the shaft when the bearing assembly 28 is locked. It is when the shaft is in this orbiting condition that the importance of resiliently holding the shaft by bearing assembly 28 becomes apparent because an extremely unbalanced condition in the weight 14 might otherwise tend to "orbit" the shaft to too great a degree. By resiliently holding the outer race of the bearing in assembly 28, an orbiting condition is allowed but within a safe range. Of course, the degree of orbiting will always be proportional to the degree of unbalance of the weight 14 at least up to the point where the unbalance is so great as to fully compress the resilient blocks holding outer race 32 in assembly 28. In practice, it has been found that such extreme unbalance is rarely encountered.

Thus, and as mentioned above, the degree of orbit achieved by the shaft is proportional to the degree of unbalance of the weight 14. Thus to measure the degree of unbalance of the weight, it only is required to measure the degree of orbit achieved by the rotating shaft. This is accomplished through the use of the registration disc 50, the displacing roller 56 and the gauge 58. As previously mentioned, the registration disc is held with sufficient pressure between the friction material pads 52 and 54 that the registration disc will orbit with and to the same degree as the shaft 10. Thus, when the shaft is orbiting, the outside peripheral edge of the disc will actually transcribe a larger circle than it would do if the shaft were not orbiting, in which case the registration disc would simply rotate about the center line of the machine. To take a measure of the degree to which the shaft and the registration disc orbit, the roller 56 is brought to bear against the outside peripheral edge of the registration disc by depressing handle 61. With some practice, the operator will find that he can detect the amount of displacement of the registration disc to bring it into position wherein it rotates about the center line of the machine, even though the shaft is still orbiting. In other words, the roller 56 is used to displace the registration disc relative to the shaft a radial distance equal to the radius of the circle transcribed by the center of the shaft orbiting about the center line of the machine. Thus, the center of the registration disc is brought back to the true center line of the machine while the shaft is still orbiting. The operator can detect when the registration disc has been moved to the true center line because when this point has been reached, the outer peripheral edge of the disc "rolls" smoothly against the roller. Thus, the amount of displacement of the disc require to bring it back to the true line of the machine is a precise measure of the degree to which the shaft is orbiting or, in other words, is an exact measure of the amount of unbalance of the weight. Further, when this amount of displacement of the registration disc is measured when the machine has been stopped, as is explained hereinafter, it is also possible to obtain a precise indication of which side of the weight has the extra amount of mass which is causing the unbalance. This will be apparent if one visualizes the weight having an unbalancing mass at one point on its outer edge. As the shaft and weight are rotated, this extra mass will end to cause that particular point of the weight to be thrown outwardly under centrifugal force which thus causes the weight and shaft to orbit with the point of the weight carrying the extra mass transcribing a larger circle than the outer edge of the weight would transcribe if it were perfectly balanced. Now, as the registration disc is carried with the shaft, there will be one point on the outer peripheral edge of the disc which will follow that point on the weight which carries the extra mass and this point on the peripheral disc will also transcribe a larger circle than the outer edge of the disc would normally transcribe if the weight and shaft and disc were not orbiting. Now, as the roller 56 is brought to bear against the outer edge of the registration disc, the first point on the registration disc contacted by the roller as the roller is brought towards the center line of the machine will be that point which is following the extra mass on the weight. As the roller is further advanced towards the center line of the machine, the discs will be displaced until it ceases to orbit, at which point the operator will detect that the outer edge of the registration disc is running smoothly on the roller. Thus, the disc is displaced precisely diametrically opposite to the point at which the extra mass is carried on the weight and in an amount proportional to the degree of orbit or, in other words, proportional to the degree of unbalance.

Figure 5:
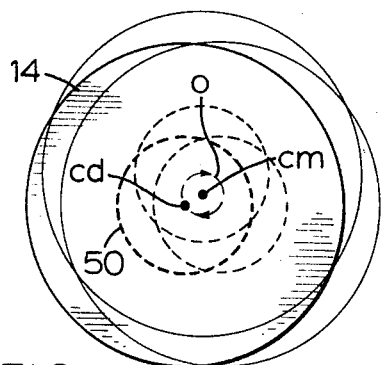

The foregoing description of the manner in which the registration disc is used to measure the amount of and position of the extra mass can be better understood by reference to FIGS. 4 to 8 inclusive. These are schematic representations of a cross-sectional view of the registration disc and the weight at various times during the measuring procedure. FIG. 4 shows the relationship between the registration disc and the weight before rotation of the shaft has commenced. The center of the shaft $cs$ is aligned with the center of the machine $cm$ which corresponds at all times with the center of bearing 12. The center of the shaft is also aligned, of course, with the center of the registration disc $cd$. FIG. 5 shows the position of the disc and weight relative to the center line of the machine after the shaft and the disc have been rotated and are orbiting about the center line of the machine $cm$. At this time, the center of the registration disc $cd$ and center line of shaft $cs$ are still coincidental and are transcribing on orbital path about the center line of the machine. The registration disc and the weight are also shown in three different positions indicating that their outer peripheries are transcribing circles greater than the circles achieved if the weight is in perfect balance and the shaft does not orbit.

Figure 6:
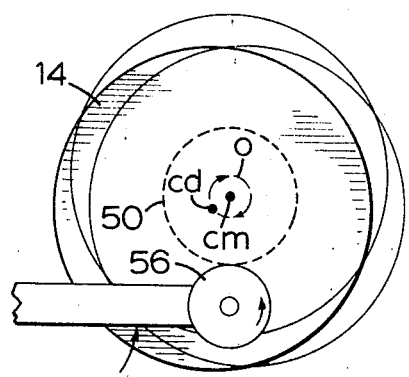
Figure 8:
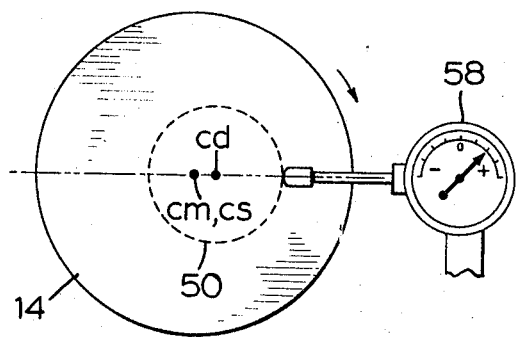

FIG. 6 shows the use of the roller 56 to bring the refrigeration disc center $cd$ back into alignment with the center of the machine $cm$. As previously mentioned, the operator can tell when the registration disc is now rotating about the center line of the machine as the outer edge of the disc will roll smoothly on the roller 56. Until this alignment is reached, the registration disc only hits the roller at fixed intervals as its outer periphery is transcribing a larger circle than defined by its diameter.

Figure 7:
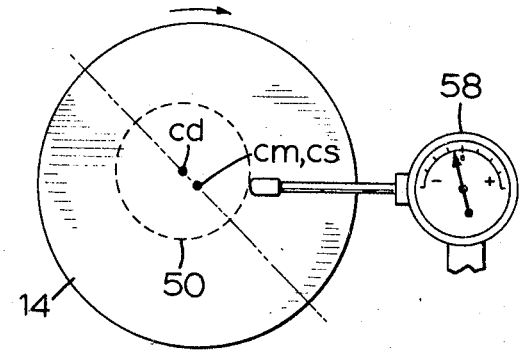

FIG. 7 shows the relative position of the weight and disc when rotation is ceased and bearing assembly 28 has been locked. At this point, the center of the shaft (and, of course, the center of the weight) has realigned with the center of the machine $cm$ but the center of the disc is now displaced relative to the center of the machine by an amount X. To measure this displacement X, the probe of the gauge 58 is brought to bear against the outer edge of the disc and the shaft is rotated slowly by hand. As the amount of displacement is proportional to the degree to which the shaft, weight and disc orbited about the center line of the machine, this dimension X is proportional to the amount of unbalance. Further, and as previously mentioned, the direction in which the displacement has occurred is diametrically opposite the position on the weight where the unbalancing extra mass is carried. The operator thus has a measure of the amount and position of the extra mass carried by weight 14 and can take the appropriate step of balancing the weight by either removing material from that portion on the weight where the extra mass is carried or by adding additional mass diametrically opposite thereto.

When the weight has been statically balanced by the operator, it is then the usual practice to realign the registration disc with the center of the shaft, again using the roller 56 so that the machine is set up for the next balancing operation on another weight.

It will be noted by reference to FIGS. 9 and 10 that the weight is fixed to the shaft by an adjustable arrangement which permits the weight to rotate about an axis transverse to the shaft. This arrangement is used to provide means for measuring the dynamic unbalance of the weight. The arrangement consists of an inner disc 62, which may actually consist of an integral shoulder on the shaft, and which has a partially spherical outer surface. Engaged on this inner disc is an outer circular plate 64 being centrally apertured with the inside face of the aperture having a similar partially spherical configuration to mate with the outer surface of the inner disc 62. A third smaller washer-like plate 66 carries a similarly shaped inner face and is held in position by a plurality of cap screws 68. Thus, it can be seen that as the cap screws are loosened or tightened, the plate 66 is drawn away from or towards plate 64 whereby to decrease or increase the amount of grip by which the plates 64 and 66 hold on to the inner disc 62. The actual weight which is being balanced is then removably attached to the outer edge of the plate 64. In this regard, it will be appreciated that this particular setup is for balancing weights which actually take the form of large washers but that the arrangement shown in FIG. 10 can be readily modified to receive any weight. It is, of course, the object of this particular arrangement to permit the weight to rotate about an axis transverse to the shaft. Such rotation will not take place if the weight is in perfect dynamic balance but if it should be dynamically unbalanced, it will rotate to a typical position which is shown in dotted lines in FIG. 10. By carefully pre-adjusting the relative position between the plate 64 and plate 66 by adjusting the grip by which these plates are held onto the inner disc 62, it is found that should the weight be dynamically unbalanced and thus rotate about an axis transverse to the shaft when the shaft is rotated, this amount of rotation will be retained after the shaft is brought to a standstill. Thus, a gauge 70 can be used to measure the amount of rotation will be retained after the shaft is brought to a of this rotation, i.e. the amount of dynamic unbalance. Further, it will be appreciated that the position of the extra weight causing the dynamic unbalance will also be pinpointed.

The foregoing is a description of the manner in which the invention is utilized in a balancing machine. As previously mentioned, the invention might also be used to mount shafts carrying ships' propellers and the like and this particular utilization of the invention is illustrated in FIG. 11. Here the same principle of mounting the shaft in a self-aligning bearing and counterbalancing the weight of the propeller by a counter-weight mounted on the shaft on the opposite side from the self-aligning bearing is employed. As a preferred expedient, the amounting arrangement of FIG. 11 also employs a second bearing assembly carrying resilient blocks whereby the orbiting of the shaft might be held within a reasonable level. As illustrated, this assembly is mounted on the opposite side of the counter-weight from the self-aligning bearing but it will be appreciated that it might be located between the counterweight and the bearing as is done when utilizing the invention in the balancing machine. In this regard, it will be appreciated that the balancing machine arrangement might have the bearing assembly 28 also mounted on the opposite side of the counterweight from the bearing 12.

Referring in detail to FIG. 11, it can be seen that the self-aligning bearing 12 is mounted on the inside of the ship's hull 74 and that a water-tight seal 76 is mounted on the shaft 10 as to prevent entry of water into the ship's hull at the bearing. The propeller 78 is mounted on the outer end of the shaft and is counterbalanced by a counterweight 20 mounted on the shaft within the hull. As a preferred expedient, a shock-absorbing material 80 might be positioned between the bearing 12 and the inside of the hull.

The driving shaft 26 is coupled to shaft 10 at the center of bearing 12 and will, of course, be connected at its other end to appropriate mounting assemblies and driving engines.

There are numerous advantages in the ship's propeller mounting arrangement as described above compared to the present time-honoured practice of mounting the shaft in two or more spaced bearings. First of all, it is not so essential to prebalance the propeller to the same degree as is necessary where the propeller is to be mounted in the known type of dual bearing arrangement. Secondly, should the propeller be damaged in operation so that its balance is thrown off, the mounting arrangement of the invention accommodates the unbalanced condition so created. The shaft simply goes into an orbit about its former center line and no vibration is transmitted to the ship. In this regard, it can be appreciated that with the known shaft mounting arrangement, even a small chip taken off one of the blades of the propeller causes extreme vibration.

There are limits to which the mounting arrangement of this invention can go in accommodating unbalance. This is the reason for the preferred arrangement which includes the resilient restraining bearing assembly 28. Should an extreme unbalanced condition be created by loss of one blade of the propeller, for instance, the bearing assembly 28 will prevent the shaft from being thrown into extreme orbit which would exceed the tolerance between the inside of shaft 10 and the driving shaft 26. However, for the normal wear and tear on a propeller that might occur over a matter of years, the arrangement as shown in FIG. 11 will accommodate the changing balance of the propeller due to this wear and tear whereas with the known mounting arrangements, it is necessary to remove, repair and rebalance such propellers at frequent intervals as even a small deterioration in the balance of the propeller causes high vibration to be transmitted to the ship's hull.

Quite apart from the changes in dynamic and static balance caused in a propeller by normal wear and tear, there is a third unbalancing effect which propellers are subject to, namely varying thrust forces as between the various blades of the propeller. These thrust forces not only change after the propeller has been in use for some time but cannot normally be detected prior to first installation and sea trials of the propeller. Thus, it is possible with the propeller to have it pre-balanced perfectly with respect to static and dynamic balance but subsequently to find that when the propeller is put into operation one of the blades has a slightly different pitch than the other blades and, as it cuts through the water, sets up a thrust force which differs from the thrust forces caused by the other blades whereby a thrust force unbalanced condition exists and with the known shaft mounting arrangement, this unbalance is also transmitted to the ship in the form of vibration. Apart from original thrust force unbalance, it is also possible, of course, to have a propeller blade bend during operation so that a propeller which, when originally installed may be in balance with respect to thrust forces, may become unbalanced in operation. Once again, the shaft mounting arrangement of the invention accommodates such a thrust force unbalance. The advantages of this ability to accommodate all three of the possible unbalancing factors in a propeller would mean that the frequency of the propeller inspection and repair can be drastically cut.

What we claim as our invention is:

1. In a balancing machine of the type including a self-aligning bearing mounted on a base and supporting a rotating member which extends through the bearing and removably supports at one end an unbalanced weight whose imbalance is to be measured, and said base supporting drive means for rotating said member in the bearing;
  (a) said rotating member having a hollow bore extending into its other end at least as far as the bearing, and a drive shaft connected to the drive means and extending into the bore and coupled to said rotating member substantially centrally of said bearing by drive connection means operative to permit the ends of the rotating member to orbit about the axis of the drive shaft;
  (b) counterweight means surrounding a portion of said rotating member between its other end and said bearing, and selectively positionable axially along said member to counterbalance the weights acting upon said member on opposite sides of the bearing;
  (c) means carried by said rotating member and spaced from said bearing for determining imbalance displacements of said member from said axis when said member is driven with an unbalanced weight supported thereon, and comprising a registration disk having a hole through its center to receive said member and the hole being larger in diameter than said member, pressure pad means mounted on the member and disposed to apply axial forces on the disk to yieldably support it in a radial plane, and means supported on the frame and movable into contact with the periphery of the disk and operative to shift it relative to said axis to cause the disk to rotate in a nonorbital circle about its own center while the hollow member is rotating eccentrically about said axis; and
  (d) gauge means mounted on the frame and operative to measure the relative eccentricity between the disk and said member as an indication of the degree of unbalance.

2. In a machine as set forth in claim 1, annular restraining means on said frame disposed around said member and spaced from the self-aligning bearing and including means selectively displaceable toward and away from said member and operative when displaced toward the member to center it with respect to said axis, and operative when displaced away from said member to surround it in normally spaced relation and provide radial limits which the orbital motion of the member can not exceed.

References Cited
UNITED STATES PATENTS

| | | | |
|---|---|---|---|
| 2,108,624 | 2/1938 | Thearle | 73—455 |
| 2,177,252 | 10/1939 | Hanson | 73—473 |
| 2,316,524 | 4/1943 | Martin | 73—459 |
| 2,322,939 | 6/1943 | Inman | 73—473 |
| 2,378,018 | 6/1945 | Inman | 73—459 |
| 2,341,141 | 2/1944 | Greenleaf et al. | 73—473 |
| 2,553,058 | 5/1951 | Martin | 73—459 |
| 2,636,382 | 4/1953 | Martin | 73—459 |
| 2,968,185 | 1/1961 | Jacobson | 73—459 |

JAMES J. GILL, Primary Examiner

H. GOLDSTEIN, Assistant Examiner